April 14, 1953 R. B. PALMER 2,634,987
BALL AND SOCKET COUPLING
Filed June 27, 1952
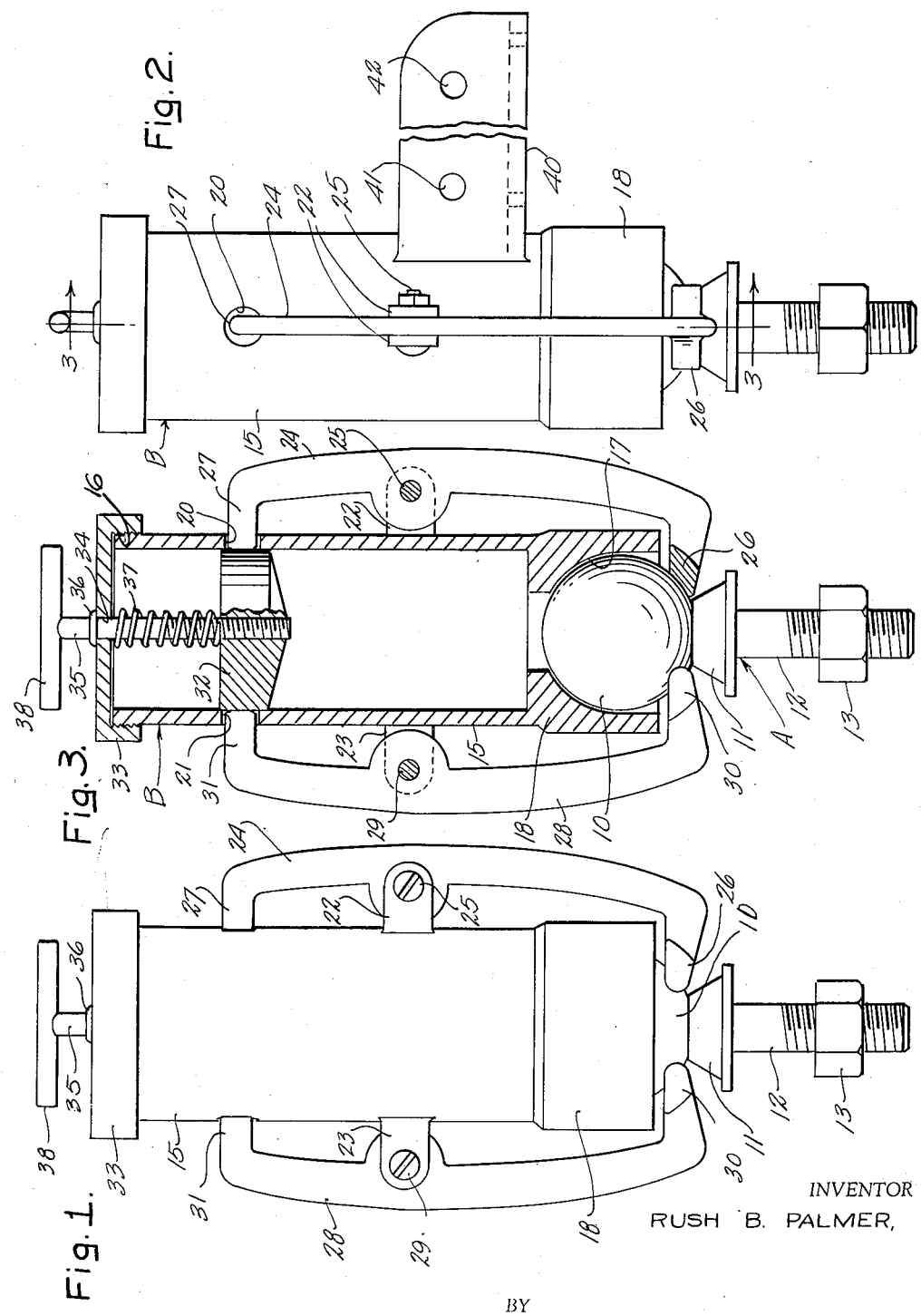
INVENTOR
RUSH B. PALMER,
BY
McMorrow, Berman + Davidson
ATTORNEYS Patented Apr. 14, 1953

2,634,987

UNITED STATES PATENT OFFICE 2,634,987

BALL AND SOCKET COUPLING

Rush B. Palmer, Quincy, Fla.

Application June 27, 1952, Serial No. 295,960

3 Claims. (Cl. 280—33.17)

This invention relates to trailer hitches and more particularly to a trailer hitch having means positively locking the ball of the hitch in the complementary socket against accidental displacement.

It is among the objects of the invention to provide an improved trailer hitch having a ball formation and a body of rigid and unitary construction providing a socket receiving the ball formation to provide a universal joint connection between a towing and a trailer vehicle; which has a tong structure carried by the socket body and engageable with the ball formation to hold the latter in the socket and a pressure block disposed between the legs of the tong structure positively holding this structure in engagement with the ball formation against the possibility of accidental release; which is easy to couple and uncouple and can be easily connected to a towing vehicle and to the tongue of a trailer vehicle; and which is simple and durable in construction, economical to manufacture, and positive and effective in operation.

Other objects and advantages will become apparent from a consideration of the following description and the appended claims in conjunction with the accompanying drawing wherein:

Figure 1 is a front elevational view of a trailer hitch illustrative of the invention;

Figure 2 is a side elevational view; and

Figure 3 is a cross sectional view on the line 3—3 of Figure 2.

With continued reference to the drawing, the trailer hitch comprises a first element, generally indicated at A, including a ball formation 10 of substantially spherical shape, a base 11 of partly conical shape joined at its smaller end to the ball formation 10 and projecting from the latter and a screw threaded stem 12 projecting from the larger end of the base 11 with its longitudinal center line extending substantially through the center of the ball formation 10. A nut 13 is threaded onto the screw threaded stem 12 for securing the element A to a suitable structural element or bracket on a towing vehicle. The hitch further comprises a second element, generally indicated at B, including a tubular body 15 of cylindrical shape having external screw threads 16 at one end thereof and having a portion near its other end thickened and provided with a recess 17 of partly spherical shape to constitute a socket formation 18 which receives the ball 10 of the element A.

The tubular body 15 is provided with diametrically opposite apertures 20 and 21 at a location near the end thereof having the external screw thread 16 and apertured lugs 22 and 23 project radially from the body at diametrically opposite locations therearound between the apertures 20 and 21 and the socket formation 18.

An elongated lever 24 is pivotally connected intermediate its length to the lug 22 by a pivot pin 25 extending through the apertures in the lug 22 and through a registering aperture in the lever 24 and extends longitudinally of the tubular body 15 from the aperture 20 to a location somewhat beyond the outer end of the socket formation 18. At its end adjacent the socket formation the lever 24 is provided with a terminal formation 26 having a surface of partly spherical shape engageable with the ball formation 10 adjacent the base 11, as illustrated in Figure 2, and has at its other end an angularly offset end portion 27 which extends through the aperture 20 in the tubular body 15.

A lever 28, similar to the lever 24, is pivotally connected intermediate its length to the lug 23 by a pivot pin 29 extending through registering apertures in the lugs and a registering aperture in the lever and also extends longitudinally of the body 15 from the aperture 21 to a location somewhat outwardly of the outer end of the socket formation 18. At its end adjacent the socket formation 18 the lever 28 is provided with a terminal formation 30 having a surface of partly spherical shape engaging the ball 10 adjacent the base 11 and in opposition to the terminal formation 26 on the lever 24 and has at its other end an angularly offset end portion 31 extending through the aperture 21.

A block 32 of cylindrical shape is slidably mounted within the tubular body 15 and is movable between a position in which it is disposed between the angularly offset end portions 27 and 31 of the levers 24 and 28, as illustrated in Figure 2, to positively hold the terminal formations 26 and 30 of the levers in engagement with the ball formation 10 and hold the ball formation in the socket recess 17, and a position in which it is clear of the angularly disposed end formations 27 and 31 of the levers to free the levers for swinging movement about the pivot pins 25 and 29 in a direction separating the terminal formations 26 and 30 to release the ball formation 10 from the socket formation 18 in the body 15.

An internally screw threaded, flange cap 33 is threaded onto the screw threaded end of the body 15 and is provided with a central aperture 34. A stem 35 extends slidably through the aperture 34 in the cap 33 and is threaded at one end into a centrally disposed tapped hole in the pressure block 32. This stem is provided intermediate its length with an abutment collar 36 which engages the outer side of the cap 33 when the pressure block 32 is disposed between the angularly offset end portions 27 and 31 of the levers 24 and 28, as illustrated in Figure 3, and a coiled compression spring 37 surrounds the stem 35 between the pressure block 32 and the inner side of the cap 33 and resiliently urges the pressure block to the above described position in which it is disposed between the angularly offset end portions 27 and 31 of the levers. A handle 38 is secured on the stem 35 at the end of the stem outside of the cap 33 and remote from the pressure block 32 for moving the pressure block 32 upwardly against the force of spring 37 until it is moved away from the angularly disposed end portions 27 and 31 of the levers to thereby free the levers for pivotal movement about the pivot pins 25 and 29, so that the terminal formations 26 and 30 of the levers can move away from each other to release the ball formation 10.

A bracket 40 of channel shaped cross section is secured at one end to the body 15 adjacent the thickened end portion of the body and projects perpendicularly from the body in a radial direction to receive the front end of a trailer tongue. This bracket is provided with spaced apart apertures 41 and 42 through which suitable bolts or pins may be extended to secure a trailer tongue to the bracket.

When the hitch is in use, the stem 12 of the element A is disposed in a substantially vertical or upright position with the ball formation 10 at the upper end of the stem. The body 15 is also disposed in an upright, substantially vertical position with the socket formation 18 at its lower end and receiving the ball formation 10. The handle 38 is at the upper end of the body 15 and, when it is desired to couple the hitch, the element B secured to the front end of the trailer tongue is raised by the handle 38 and moved until the socket recess 17 is directly over the ball formation 10. The element B is then lowered and, since the block 32 is held in a position above the apertures 20 and 21, the terminal formations 26 and 30 on the levers 24 and 28 will be forced apart by the ball formation 10 and will slide over this ball formation to a position adjacent the space 11 at the bottom of the ball formation. Upon release of the handle after the ball formation 10 is seated in the recess 17, the block 32 is moved downwardly by the spring 37 to a position between the end portions 27 and 31 of the levers 24 and 28, so that the body 15 cannot lift off the ball formation 10. The only strain on the levers 24 and 28 is that incident to holding the body 15 down on the ball 10, the towing force being transmitted from the ball formation through the thickened lower end portion of the body 15 constituting the socket 18 to the bracket 40. The terminal formations 26 and 30 are spaced from the base 11 sufficiently to provide for the usual rocking movements between the towing vehicle and the trailer and the body 15 is free to rotate around the ball formation 10 incident to turning movements between the towing vehicle or tractor and the towed vehicle or trailer.

In order to uncouple the device, it is necessary merely to raise the unit B by the handle 38 until the pressure block 32 is moved upwardly away from the end portions 27 and 31 of the levers 24 and 28, and the socket recess 17 is moved upwardly away from the ball formation 10 and the terminal formations 26 and 30 of the levers are also moved upwardly past the ball formation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A trailer hitch comprising a first unit including a ball formation, a base of partly conical shape projecting from said ball formation and a screw threaded stem projecting from said base, and a second unit including a tubular body having in one end a socket formation providing a recess of partly spherical shape opening to said one end of said body and receiving said ball formation, said body having diametrically opposite apertures near the other end thereof, apertured lugs projecting from said body at diametrically opposite locations therearound between said apertures and said socket formation, levers pivotally mounted intermediate their lengths one on each of said lugs and extending longitudinally of said tubular body, terminal formations on said levers at the ends of the latter adjacent said socket formation engageable with said ball formation adjacent said base to hold said ball formation in said socket recess, angularly disposed end portions on said levers at the ends of the latter remote from said socket formation extending one through each of the apertures in said tubular body, a block slidable in said tubular body and movable between a position in which it is disposed between the angularly disposed end portions of said levers to hold said terminal formations in engagement with said ball formation and a position in which it is clear of said angularly disposed end portions to free said terminal formations to move away from each other and release said ball formation from said socket, an apertured cap closing the other end of said tubular body, a stem secured at one end to said block and extending slidably through the aperture in said cap, an abutment on said stem engaging the outer side of said cap when said block is disposed between the angularly offset end portions of said levers, a spring disposed between said block and said cap resiliently urging said block to its position between the angularly offset end portions of said levers, a handle on the end of said stem remote from said block for manually moving said block away from said position against the force of said spring, and a bracket on said tubular body intermediate the length of the latter for connecting said tubular body to the front end of the tongue of a trailer vehicle.

2. A trailer hitch comprising a first unit including a ball formation and a screw threaded stem projecting from said ball formation, and a second unit including a tubular body having in one end a socket formation receiving said ball formation and apertures near the other end thereof, lugs projecting from said body between said apertures and said socket formation, levers pivotally mounted intermediate their lengths one on each of said lugs and extending longitudinally of said tubular body, terminal formations on said levers at the ends of the latter adjacent said socket formation engageable with said ball formation to hold the latter in said socket, angularly disposed end portions on said levers at the ends of the latter remote from said socket formation extending one through each of the apertures in said tubular body, a block slidable in said tubular body and movable between a position in which it is disposed between the angularly disposed end portions of said levers to hold said terminal formations in engagement with said ball formation and a position in which it is clear of said angularly disposed end portions to free said terminal formations to move away from each other and release said ball formation from said socket, means secured to said block for manually moving the latter from the first mentioned to the last mentioned of said positions, spring means acting between said block and said body resiliently urging said block from said last mentioned to said first mentioned position, and a bracket on said tubular body adjacent said socket formation for connection to the front end of the tongue of a trailer vehicle.

3. A trailer hitch comprising a first unit including a ball formation and a screw threaded stem projecting from said ball formation, and a second unit including a tubular body having in one end a socket formation receiving said ball formation and apertures near the other end thereof, lugs projecting from said body between said apertures and said socket formation, levers pivotally mounted intermediate their lengths one on each of said lugs and extending longitudinally of said tubular body, terminal formations on said levers at the ends of the latter adjacent said socket formation engageable with said ball formation to hold the latter in said socket, angularly disposed end portions on said levers at the ends of the latter remote from said socket formation extending one through each of the apertures in said tubular body, a block slidable in said tubular body and movable between a first position in which it is disposed between the angularly disposed end portions of said levers to hold said terminal formations in engagement with said ball formation and a second position in which it is clear of said angularly disposed end portions to free said terminal formations to move away from each other and release said ball formation from said socket, an apertured cap closing the other end of said tubular body, a stem secured at one end to said block and extending slidably through the aperture in said cap, an abutment on said stem engaging the outer side of said cap when said block is in said first position, a spring disposed between said block and said cap resiliently urging said block to said first position, a handle on the end of said stem remote from said block for manually moving said block from said first to said second position against the force of said spring, and a bracket on said tubular body and projecting substantially perpendicularly therefrom for connecting said body to the front end of the tongue of a trailer vehicle.

RUSH B. PALMER.

References Cited in the file of this patent

UNITED STATES PATENTS

| Number | Name | Date |
|---|---|---|
| 2,292,751 | Forney | Aug. 11, 1942 |
| 2,458,209 | Sawatzki | Jan. 4, 1949 |

FOREIGN PATENTS

| Number | Country | Date |
|---|---|---|
| 104,206 | Sweden | Apr. 7, 1942 |